(12) United States Patent
Chang

(10) Patent No.: US 11,778,362 B2
(45) Date of Patent: Oct. 3, 2023

(54) METHOD OF CONTROLLING DISPLAY BY HEADSET WITH INLINE CONTROL, AND RELATED DEVICES

(71) Applicants: K-TRONICS (SU ZHOU) TECHNOLOGY CO., LTD., Jiangsu (CN); BOE Technology Group Co., Ltd., Beijing (CN)

(72) Inventor: Shun-Chi Chang, Beijing (CN)

(73) Assignees: K-TRONICS (SU ZHOU) TECHNOLOGY CO., LTD., Suzhou (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/326,928

(22) Filed: May 21, 2021

(65) Prior Publication Data

US 2022/0141567 A1 May 5, 2022

(30) Foreign Application Priority Data

Oct. 30, 2020 (CN) .......................... 202011187151.4

(51) Int. Cl.
*H04R 1/10* (2006.01)
*G06F 3/16* (2006.01)
(Continued)

(52) U.S. Cl.
CPC ............. *H04R 1/1041* (2013.01); *G06F 3/16* (2013.01); *G06F 11/3051* (2013.01);
(Continued)

(58) Field of Classification Search
CPC ........ H04R 5/033; H04R 5/04; H04R 1/1041; H04R 3/00; H04R 29/001; H04R 3/12;
(Continued)

(56) References Cited

U.S. PATENT DOCUMENTS 9,313,595 B1* 4/2016 Jain ..................... H04R 29/00
2007/0211721 A1* 9/2007 Thijssen ............. H04M 1/6058
370/390

(Continued)

FOREIGN PATENT DOCUMENTS

CN 2859967 Y 1/2007
CN 102769689 A 11/2012
(Continued)

OTHER PUBLICATIONS

Office issued in Chinese Application 202011187151.4 dated Nov. 25, 2022.

*Primary Examiner* — Carolyn R Edwards
*Assistant Examiner* — Kuassi A Ganmavo
(74) *Attorney, Agent, or Firm* — ArentFox Schiff LLP; Michael Fainberg

(57) ABSTRACT

Disclosed are a method of controlling a display by a headset with inline control, and related devices. The method includes: detecting whether an headset jack of the display is plugged with the headset; after the headset jack of the display is determined to be plugged with the headset, inputting a detection bias voltage to the headset, and monitoring a feedback signal of the detection bias voltage; in response to detecting a change in the feedback signal of the detection bias voltage, identifying a user's control instruction to the display using the headset according to a control signal sent by the headset; and controlling the display to perform a corresponding display operation according to the control instruction.

11 Claims, 5 Drawing Sheets

(51) Int. Cl.
  *G06F 11/30*   (2006.01)
  *H04M 1/60*    (2006.01)
  *H04R 29/00*   (2006.01)
  *H04R 3/00*    (2006.01)
  *H04R 5/04*    (2006.01)
  *H04R 3/12*    (2006.01)
  *H04R 5/033*   (2006.01)

(52) U.S. Cl.
  CPC ............. *H04M 1/6058* (2013.01); *H04R 3/00* (2013.01); *H04R 3/12* (2013.01); *H04R 5/033* (2013.01); *H04R 5/04* (2013.01); *H04R 29/001* (2013.01)

(58) Field of Classification Search
  CPC ... H04R 2107/00; H04R 2420/05; G06F 3/16; G06F 11/3051; G06F 13/409; H04M 1/6058; H04M 1/72527
  See application file for complete search history.

(56) References Cited

U.S. PATENT DOCUMENTS

| | | | |
|---|---|---|---|
| 2008/0164994 A1 | 7/2008 | Johnson et al. | |
| 2009/0180354 A1 | 7/2009 | Sander et al. | |
| 2009/0180659 A1* | 7/2009 | Sander | H04M 1/72409 381/384 |
| 2009/0182913 A1* | 7/2009 | Rosenblatt | H04M 1/6058 710/72 |
| 2010/0240260 A1* | 9/2010 | Kao | H04M 1/6058 381/384 |
| 2011/0057711 A1* | 3/2011 | Hung | H04M 1/72409 327/365 |
| 2011/0150234 A1* | 6/2011 | Johnson | H01R 29/00 381/74 |
| 2014/0169585 A1* | 6/2014 | Howes | H04R 1/086 381/91 |
| 2015/0092954 A1* | 4/2015 | Coker | H04M 1/72409 381/74 |
| 2015/0289049 A1 | 10/2015 | Hsieh et al. | |
| 2016/0048218 A1* | 2/2016 | Kim | G06F 3/0362 455/557 |
| 2016/0309251 A1* | 10/2016 | Poulsen | H04R 1/1041 |
| 2017/0288728 A1* | 10/2017 | Gether | H04B 3/54 |
| 2017/0300112 A1 | 10/2017 | Zhou et al. | |

FOREIGN PATENT DOCUMENTS

| | | |
|---|---|---|
| CN | 103634718 A | 3/2014 |
| CN | 103901791 A | 7/2014 |
| CN | 104780484 A | 7/2015 |
| CN | 104967740 A | 10/2015 |
| CN | 205081951 U | 3/2016 |
| CN | 205864668 A | 1/2017 |
| CN | 106453863 A | 2/2017 |
| CN | 106993243 A | 7/2017 |
| CN | 107872751 A | 4/2018 |
| CN | 108718434 A | 10/2018 |
| CN | 108989545 A | 12/2018 |
| CN | 210247013 U * | 4/2020 |
| CN | 210247013 U | 4/2020 |
| TW | M535437 U * | 5/2015 |

\* cited by examiner

US 11,778,362 B2

METHOD OF CONTROLLING DISPLAY BY HEADSET WITH INLINE CONTROL, AND RELATED DEVICES

CROSS REFERENCE TO RELATED APPLICATIONS

This application is based on and claims priority under 35 U.S.C 119 to Chinese Patent Application No. 202011187151.4, filed on Oct. 30, 2020, in the China National Intellectual Property Administration. The entire disclosure of the above application is incorporated herein by reference.

FIELD

The disclosure relates to the field of display technology, particularly to a method of controlling a display by a headset with inline control, and related devices.

BACKGROUND

All non-mobile device displays (such as desktop computers and televisions) use headset sockets, such that a jack "Audio out" may be connected to listen to music. The inline control for headset is usually provided with one or three buttons (HOOK, Volume+, Volume −). In general, a inline control board on the headset implements corresponding functional control in such a manner that a control chip in a mobile device (e.g., cell phone, or tablet computer) parses a signal therefrom. For a non-mobile device display, which generally only includes a jack for outputting music to the headset, it cannot respond to a control signal, and thus corresponding functional control cannot be implemented.

SUMMARY

An embodiment of the disclosure provides a method of controlling a display by a headset with inline control. The method includes: detecting whether a headset jack of the display is plugged with the headset; after the headset jack of the display is determined to be plugged with the headset, inputting a detection bias voltage to the headset, and monitoring a feedback signal of the detection bias voltage; in response to detecting a change in the feedback signal of the detection bias voltage, identifying a user's control instruction to the display using the headset according to a control signal sent by the headset; and controlling the display to perform a corresponding display operation according to the control instruction.

An embodiment of the present invention further provides a control circuit board of a display device, including: a detection module configured to detect whether a headset jack of the display is plugged with a headset with inline control; a comparator configured to, after the headset jack of the display is determined to be plugged with the headset, input a detection bias voltage to the headset, and monitor a feedback signal of the detection bias voltage; and a micro control circuit configured to identify a user's control instruction to the display using the headset according to a control signal sent by the headset with inline control in response to detecting a change of the feedback signal of the detection bias voltage, wherein the micro control circuit is further configured to control the display to perform a corresponding display operation according to the control instruction.

An embodiment of the disclosure further provides a display, which includes a control circuit board. The control circuit board includes: a detection module configured to detect whether a headset jack of the display is plugged with a headset with inline control; a comparator configured to, after the headset jack of the display is determined to be plugged with the headset, input a detection bias voltage to the headset, and monitor a feedback signal of the detection bias voltage; and a micro control circuit configured to identify a user's control instruction to the display using the headset according to a control signal sent by the headset with inline control in response to detecting a change of the feedback signal of the detection bias voltage, wherein the micro control circuit is further configured to control the display to perform a corresponding display operation according to the control instruction.

DETAILED DESCRIPTION OF THE EMBODIMENTS

Figure 1:
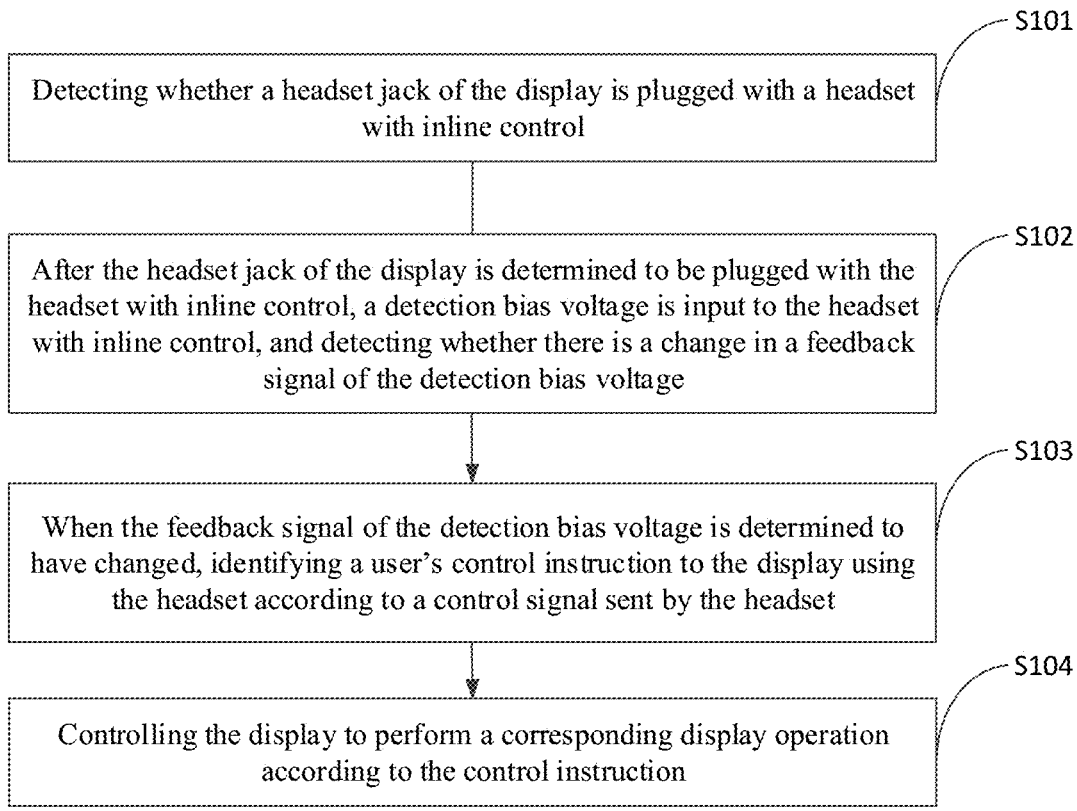
FIG. 1 is a flow diagram of a method of controlling a display by a headset with inline control in some embodiments of the disclosure.

To make the objectives, technical solutions and advantages of the embodiments of the disclosure clearer, the technical solutions in the embodiments of the disclosure will be described clearly and completely in conjunction with the accompanying drawings in the embodiments of the disclosure. Obviously, the described embodiments are only a part of the embodiments of the disclosure, and not all the embodiments. Moreover, the embodiments in the disclosure and the features in the embodiments can be combined with each other without conflict. Based on the embodiments described herein, all other embodiments obtained by those of ordinary skill in the art without creative work shall fall into the protection scope of the disclosure.

Unless otherwise defined, technical or scientific terms used in the disclosure shall have ordinary meanings understood by those of ordinary skill in the art to which the disclosure pertains. The word "comprise" or "include" or the like means that an element or item appearing before such a word covers listed elements or items appearing after the word and equivalents thereof, and does not exclude other elements or items. The word "connect" or "interconnect" or the like is not limited to physical or mechanical connections, but may include electrical connections, regardless of direct or indirect connections. The words "inner", "outer", "up", "down", and the like are only used to indicate a relative positional relationship. When the position of a described object changes, the relative positional relationship may also change accordingly.

It should be noted that sizes and shapes in the drawings do not reflect the true scale, and are merely intended to schematically illustrate the disclosure. Furthermore, same or similar reference numerals throughout represent same or similar elements or elements having same or similar functions.

An embodiment of the disclosure provides a method of controlling a display by a headset with inline control, as shown in FIG. 1, the method including the following.

S101, whether a headset jack of the display is plugged with a headset with inline control is detected.

Figure 2:
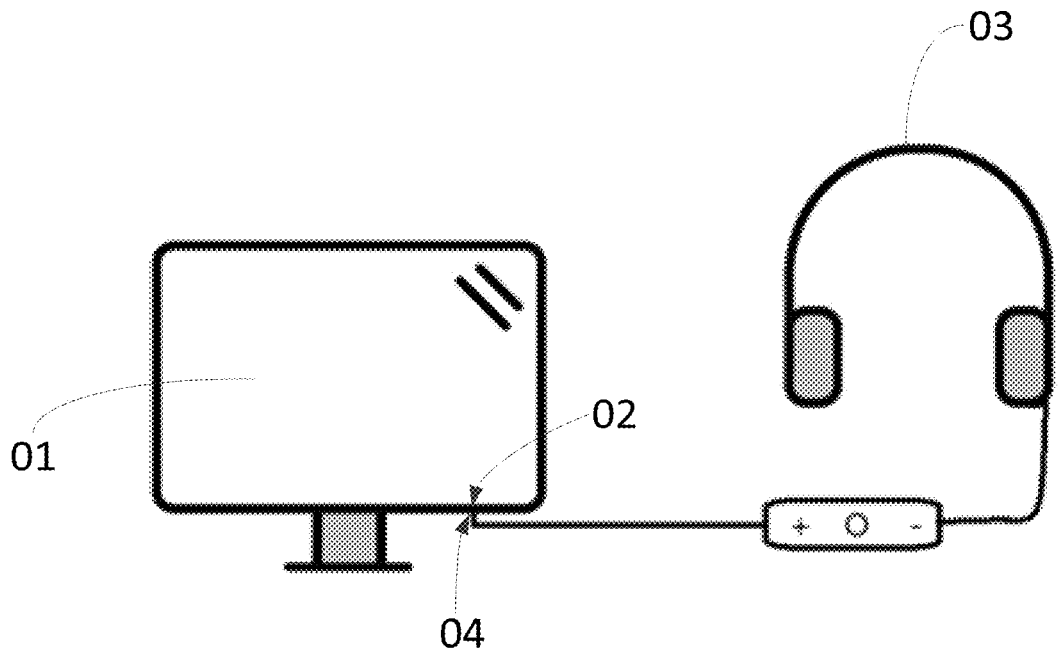
FIG. 2 is a structure diagram of a headset with inline control and a display.
Figure 3A:
FIG. 3A is a structure diagram of a 3-pole plug of a headset.
Figure 3B:
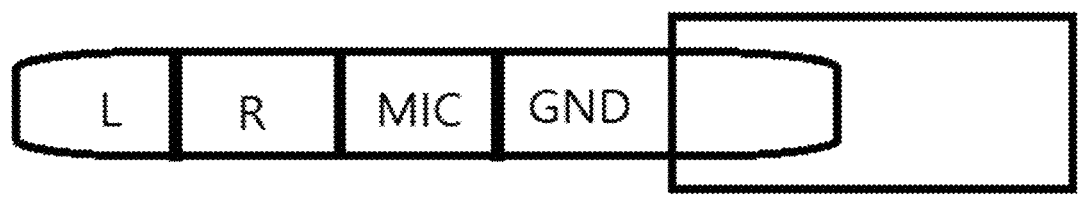
FIG. 3B is a structure diagram of a 4-pole plug of an OMTP type headset.
Figure 3C:
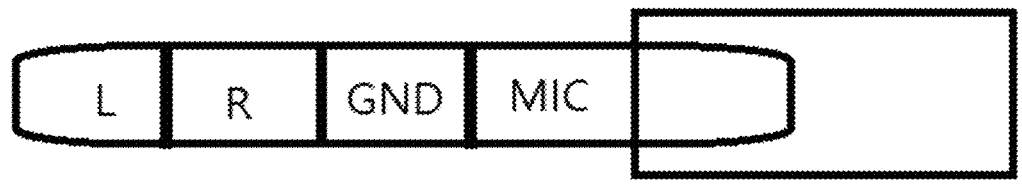
FIG. 3C is a structure diagram of a 4-pole plug of a standard type headset.

In some embodiments, as shown in FIG. 2, which is a schematic diagram of a non-mobile device display (such as a desktop computer) and a headset with inline control, the display 01 is generally provided with a headset jack 02 for plug in a headset with inline control 03 for a function of listening to music or the like. The headset with inline control 03 has a headset connector 04. In some embodiments, the headset connector 04 is a 3.5 mm plug, including two types: 3-pole and 4-pole. The 4-pole plug includes two models: standard and OMTP. As shown in FIGS. 3A and 3B, FIG. 3A is a schematic diagram of a 3-pole plug, FIG. 3B is a schematic diagram of a 4-pole plug of an OMTP model, and FIG. 3C is a schematic diagram of a 4-pole plug of a standard model, where the 3-pole plug has 3 conductors for left audio channel (L), right audio channel (R), and ground (GND) successively from tip to root, while the headset with this type of connector does not support a microphone. The 4-pole plug has a conductor supporting a microphone. As can be seen from FIGS. 3B and 3C, for the headset of the standard model and the OMTP model, positions of microphone (MIC) conductors and ground (GND) conductors are just opposite. Embodiments of the disclosure are described with the 4-pole plug of the standard model in FIG. 3C as an example.

S102, after the headset jack of the display is determined to be plugged with the headset with inline control, a detection bias voltage is input to the headset with inline control, and whether there is a change in a feedback signal of the detection bias voltage is detected.

In some embodiments, if no change in the feedback signal of the detection bias voltage is detected, detection continues at step S101 until a change in the feedback signal of the detection bias voltage is detected, and the process goes to S103.

Figure 4:
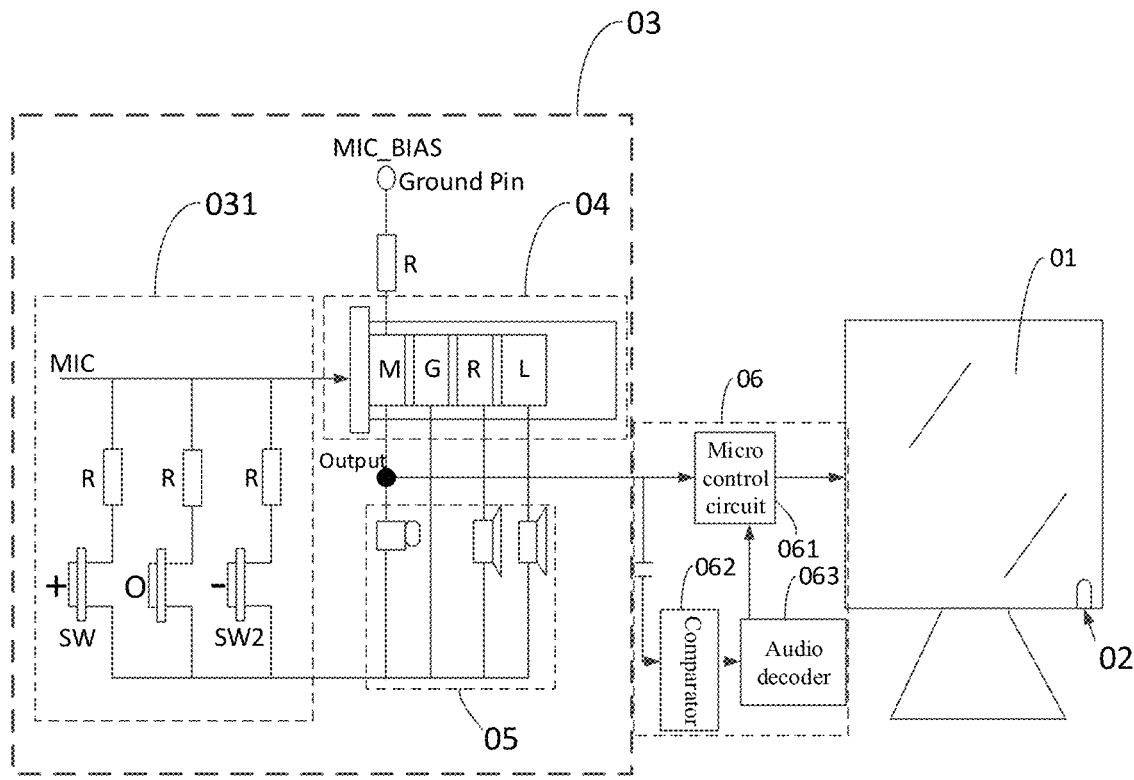
FIG. 4 is a schematic diagram of a display device in some embodiments of the present invention.

In some embodiments, as shown in FIG. 4, which shows a schematic diagram of a specific circuit structure inside the headset with inline control corresponding to FIG. 2, the headset with inline control 03 has three main parts: a headset control circuit 031, a headset connector 04 and a microphone 05, where headset buttons (+, O, −) corresponding to headset buttons shown in FIG. 2 are provided in the headset control circuit 031. The button "+" may generally be used for operations of increasing the volume, increasing the brightness and the like; the button "−" may generally be used for operations of lowering the volume, reducing the brightness and the like; and the button "O" may generally be used for operations of playing, pausing and the like, and a user may select a button as needed. A button "O" on a traditional headset can only be used for operations of playing, pausing and the like, but cannot control a display 01 to perform corresponding operations (such as turn-on and turn-off operations). The display 01 in FIG. 4 has a headset jack 02 in a lower right corner, and part for the headset connector 04 in FIG. 4 is a specific circuit structure, while in actual use, the headset connector 04 is a circular plug to be plugged into the headset jack 02 in the lower right corner of the display 01. In FIG. 4, a control circuit board 06 is also provided between the display 01 and the headset with inline control 03, and the control circuit board 06 includes a micro control circuit 061 (MCU), a comparator 062 (OP) and a tone decoder 063. In some embodiments, the control circuit board 06 may be provided inside the display 01 or outside the display 01. After the headset jack 02 of the display 01 is detected to be plugged with the headset with inline control 03, a detection bias voltage MIC_BIAS is input to ends of MIC and Ground Pin of the headset with inline control 03, and the comparator 062 in the control circuit board 06 detects whether there is a change in a feedback signal of the detection bias voltage MIC_BIAS to perform the subsequent process.

S103, when the feedback signal of the detection bias voltage is determined to have changed, a user's control instruction to the display using the headset inline control is identified according to a control signal sent by the headset.

In some embodiments, as shown in FIG. 4, when the comparator 062 detects a change in the feedback signal of the detection bias voltage MIC_BIAS, the headset with inline control 03 sends a control signal, and the micro control circuit 061 identifies, according to the control signal sent by the headset with inline control 03, the user's control instruction to the display 01 using the headset with inline control 03, such as whether the user needs to adjust the volume, adjust the brightness or perform a turn-on/off operation.

S104, the display is controlled to perform a corresponding display operation according to the control instruction.

In some embodiments, if the user's control instruction to the display using the headset with inline control is identified to be a turn-on or turn-off operation, it is determined that the user triggered the button "O", and if the control instruction is adjusting the volume, it is determined that the user triggered the button "+" or −.

In the above-mentioned method of controlling a display by a headset with inline control provided by embodiments of the disclosure, the user may control the display to perform the corresponding display operation by using the headset with inline control, and the user does not need to operate function buttons on the display from a close distance. In an electronic sports scenario, a game operation player may switch corresponding operations through a headset with inline control he wears during a game call, so that the instructions can be responded more timely, thereby better the user experience.

In some embodiments, in the above-mentioned method of controlling a display by a headset with inline control provided by embodiments of the disclosure, detecting whether there is a change in a feedback signal of the detection bias voltage is implemented by:

detecting whether there is a voltage change or a frequency change in the feedback signal of the detection bias voltage.

In some embodiments, a system of the display includes a first system and a second system. Accordingly, the headset with inline control correspondingly includes a headset for the first system, and a headset for the second system.

In some embodiments, the headset is determined to be the headset for the first system when the change in the feedback signal of the detection bias voltage is detected to be only a voltage change; and the headset is determined to be the headset for the second system when the change in the feedback signal of the detection bias voltage is detected to include a frequency change.

In some embodiments, the first system is an Android system, and the second system is an iphone system. The headset accordingly includes a headset corresponding to the Android system, and a headset corresponding to the iphone system. The change in the feedback signal of the detection bias voltage after the detection bias voltage is input to the headset corresponding to the iphone system generally includes both voltage and frequency changes.

In some embodiments, the headset with inline control is determined to be the headset for the Android system when the change in the feedback signal of the detection bias voltage is detected to be only a voltage change.

In some embodiments, as shown in FIG. 4, after the detection bias voltage MIC_BIAS is input to the headset with inline control 03, when the user triggers any of the button "+", the button "−" and the button "O", the comparator 062 detects that the change in the feedback signal of the detection bias voltage MIC_BIAS is a voltage change, and the micro control circuit 061 identifies a corresponding control instruction according to different voltage changes corresponding to the button "+", the button "−" and the button "O", respectively, and thus, a button pressing action may be identified according to the change in the feedback voltage signal of the detection bias voltage.

The headset with inline control is determined to be the headset with inline control for the iphone system when the change in the feedback signal of the detection bias voltage is detected to include a frequency change.

In some embodiments, as shown in FIG. 4, after the detection bias voltage MIC_BIAS is input to the headset with inline control 03, when the user triggers any of the button "+", the button "−" and the button "O", the comparator 062 detects that the change in the feedback signal of the detection bias voltage MIC_BIAS includes a voltage change and a frequency change, for example a frequency is detected when the user triggers the button "+", another frequency is detected when the user triggers the button "−", and a frequency change is detected and changes in both voltages output from a first switch SW and a second switch SW2 are detected when the user triggers the button "O", and the micro control circuit 061 identifies a corresponding control instruction according to different frequency changes and voltage changes corresponding to the button "+", the button "−" and the button "O", respectively, and thus, a button pressing action may be identified according to the feedback frequency change and voltage signal change of the detection bias voltage.

In some embodiments, in the above-mentioned method of controlling a display by a headset with inline control provided by embodiments of the disclosure, identifying a user's control instruction to the display using the headset with inline control according to a control signal sent by the headset with inline control includes:

when the headset is determined to be the headset for the Android system, determining the control instruction includes:

determining that the user triggered a first button if the voltage output from the first switch is changed;

determining that the user triggered a second button if the voltage output from the second switch is changed; and determining that the user triggered an answer button if both the voltages output from the first switch and the second switch are changed.

Figure 5A:
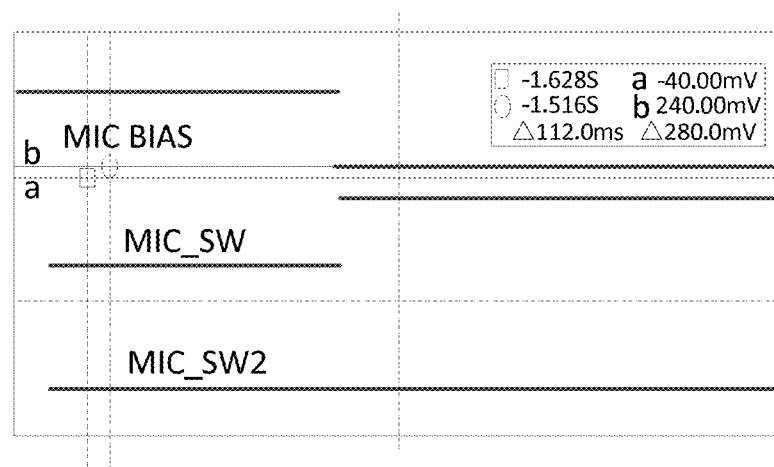
FIG. 5A is a schematic diagram of a change in a voltage output from a first switch SW received by a connected micro control circuit MCU in the case the headset with inline control in FIG. 4 is used for an Android system.
Figure 5B:
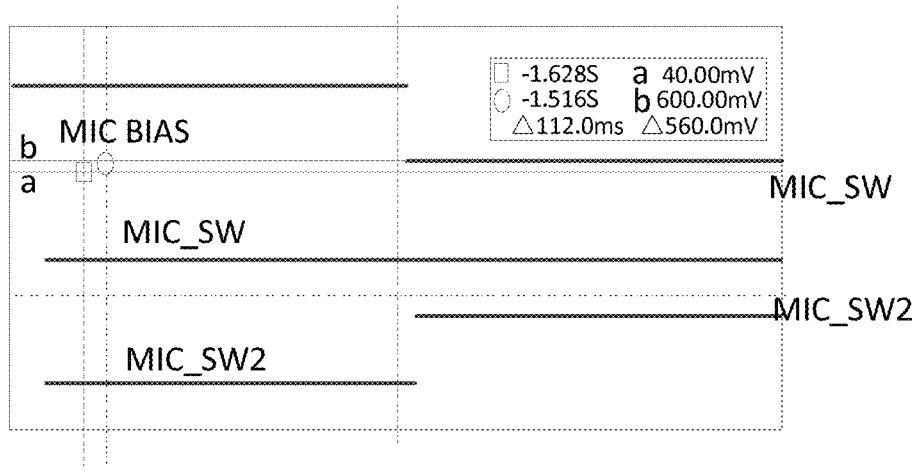
FIG. 5B is a schematic diagram of a change in a voltage output from a second switch SW2 received by a connected micro control circuit MCU in the case the headset with inline control in FIG. 4 is used for an Android system.
Figure 5C:
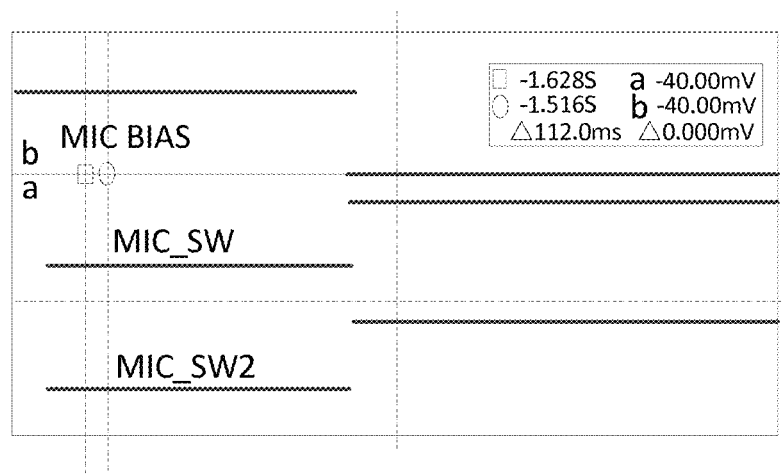
FIG. 5C is a schematic diagram of changes in both voltages output from a first switch SW and a second switch SW2 received by a connected micro control circuit MCU in the case the headset with inline control in FIG. 4 is used for an Android system.

In some embodiments, after the detection bias voltage is input to the Android system corresponding to the headset with inline control, the feedback signal change of the detection bias voltage is generally a voltage change. As shown in FIG. 4, the headset buttons (+, O, −) are embodied as three switches in the circuit. For example, the first switch corresponding to the button "+" is denoted by SW, and the second switch corresponding to the button "−" is denoted by SW2. After the detection bias voltage is input, when the user triggers the button "+", the first switch SW is turned on, and a voltage signal output from an output terminal Output changes; and as shown in FIG. 5A, when the micro control circuit 061 receives a change in the voltage output from the first switch SW, the micro control circuit 061 transmits a control signal to a scaler. When the user triggers the button-, the second switch SW2 is turned on, and the voltage signal output from the output terminal Output also changes, and as shown in FIG. 5B, when the micro control circuit 061 receives a change in the voltage output from the second switch SW2, the micro control circuit 061 transmits a control signal to the scaler. When the user triggers the button "O", the voltage signals output from the output terminal Output embodying the first switch SW and the second switch SW2 change, and as shown in FIG. 5C, when the micro control circuit 061 receives changes in both voltages output from the first switch SW and the second switch SW2, the micro control circuit 061 transmits a control signal to the scaler. Therefore, a button pressing operation may be identified by detecting a change in the feedback signal of the detection bias voltage (the signal from the output terminal Output).

In some embodiments, in the above-mentioned method of controlling a display by a headset with inline control provided by embodiments of the disclosure, identifying a user's control instruction to the display using the headset with inline control according to a control signal sent by the headset is specifically:

when the headset is determined to be the headset for the iphone system, detecting whether there is change in a feedback frequency of the detection bias voltage, and determining the control instruction includes:

determining that the user triggered a first button if only a first frequency is detected; determining that the user triggered a second button if only a second frequency is detected, wherein the first frequency is greater than the second frequency; and determining that the user triggered an answer button if a frequency change is detected and changes in both the voltages output from the first switch and the second switch of the headset for the iphone system are detected.

Figure 6A:
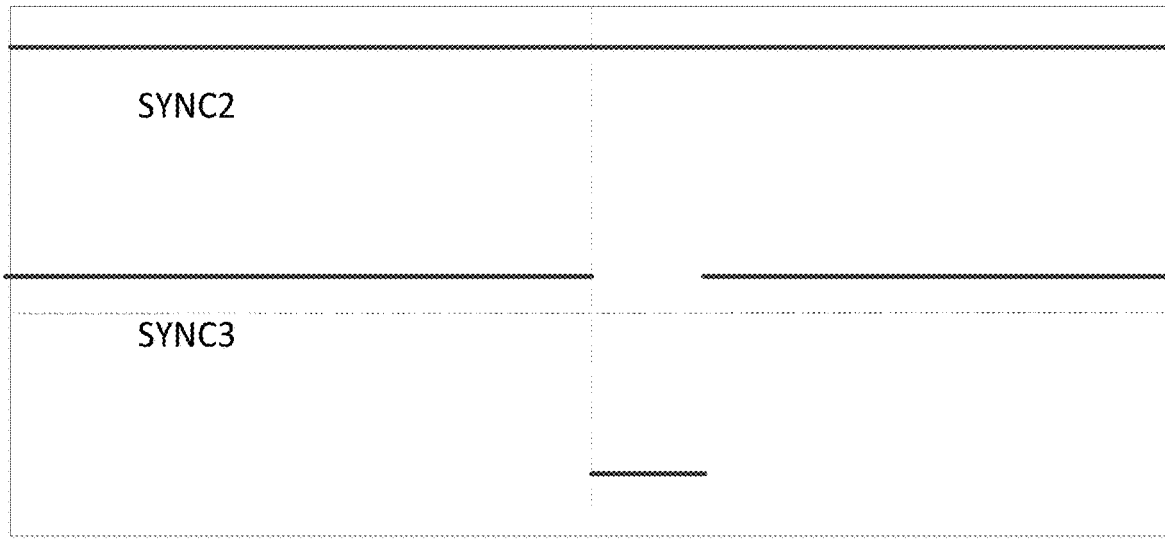
FIG. 6A is a schematic diagram of a LOW control signal transmitted by SYN3 received by a connected micro control circuit MCU in the case the headset with inline control in FIG. 4 is used for an iPhone system.
Figure 6B:
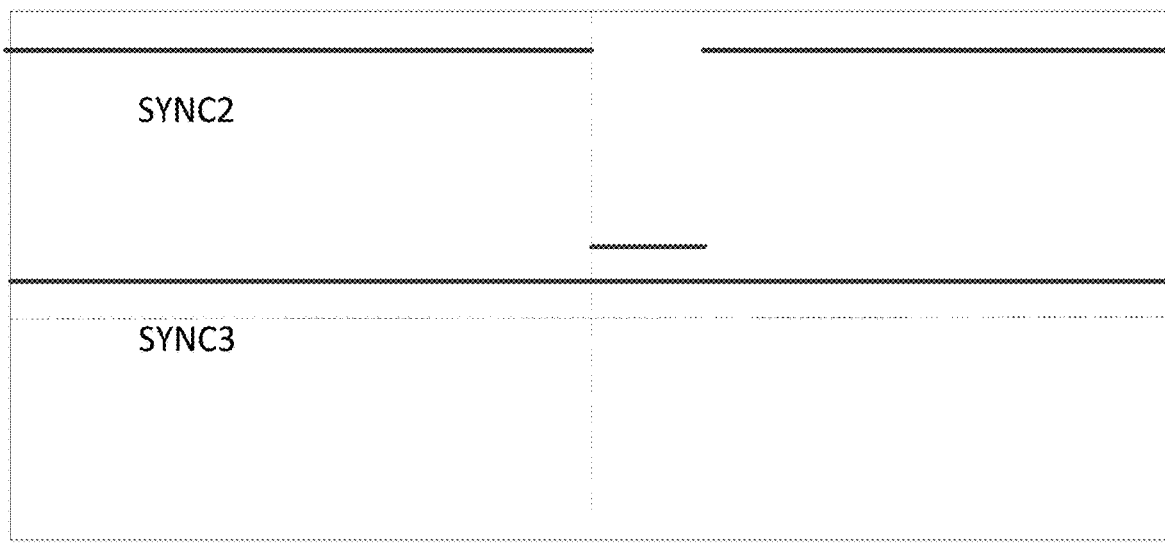
FIG. 6B is a schematic diagram of a LOW control signal transmitted by SYN2 received by a connected micro control circuit MCU in the case the headset with inline control in FIG. 4 is used for an iPhone system.

In some embodiments, as shown in FIG. 4, after the detection bias voltage is input to the headset with inline control for the iphone system, the comparator 062 detects a frequency change. If only the first frequency is detected, i.e., when the tone decoder 063 determines the frequency change is about 168 KHz, it is determined that the user triggered the button "+", and SYNC3 transmits a LOW control signal to the micro control circuit 061, and when the micro control circuit 061 receives the corresponding button, like the triggering operation of pressing the button "+" for the Android system, the micro control circuit 061 transmits a control signal to a scaler, as shown in FIG. 6A. If only the second frequency is detected, i.e., when the tone decoder 063 determines the frequency change is about 130 KHz, SYNC2 transmits a LOW control signal to the micro control circuit 061, and when the micro control circuit 061 receives the corresponding button, like the triggering operation of pressing the button "−" for the Android system, the micro control circuit 061 transmits a control signal to the scaler, as shown in FIG. 6B. If changes in both the voltages output from the first switch SW and the second switch SW2 are detected while the frequency change is detected (FIG. 5C), it is determined that the user triggered the answer button "O", like the principle of triggering the button "O" for the Android system. Therefore, a button pressing operation may be determined by detecting the feedback frequency and voltage changes of the detection bias voltage MIC_BIAS and determining the frequency magnitude through the tone decoder 063.

In some embodiments, in the above-mentioned method of controlling a display by a headset with inline control provided by embodiments of the disclosure, controlling the display to perform a corresponding display operation according to the control instruction is specifically:

controlling the display to increase the volume or increase the display brightness if the control instruction is determined to be the user triggering the first button, i.e., the button "+".

In some embodiments, as shown in FIG. 4, the display 01 is controlled to increase the volume or increase the display brightness if the micro control circuit 061 determines that the user triggered the button "+"; and the display is controlled to lower the volume or reduce the display brightness if the control instruction is determined to be the user triggering the second button, i.e., the button "−".

In some embodiments, as shown in FIG. 4, the display 01 is controlled to lower the volume or reduce the display brightness if the micro control circuit 061 determines that the user triggering the button "−"; and the display is controlled to perform a menu display, turn-on or turn-off operation based on a current display state of the display, if the control instruction is determined to be the user triggering the answer button.

In some embodiments, as shown in FIG. 4, the display 01 is controlled to perform a menu display, turn-on or turn-off operation if the micro control circuit 061 determines that the user triggered the answer O button.

In some embodiments, in the above-mentioned method of controlling a display by a headset with inline control provided by embodiments of the disclosure, controlling the display to perform a menu display, turn-on or turn-off operation based on a current display state of the display, if the control instruction is determined to be the user triggering the answer button is specifically:

controlling the display to perform a menu display or turn-off operation if a current display state of the display is an on state.

In some embodiments, as shown in FIG. 4, the micro control circuit 061 controls the display 01 to perform a menu display or turn-off operation if the current display state of the display 01 is an on state and the user triggers the answer O button; and the display is controlled to perform a turn-on operation if the current display state of the display is an off state.

In some embodiments, as shown in FIG. 4, the micro control circuit 061 controls the display 01 to perform a turn-on operation if the current display state of the display 01 is an off state and the user triggers the answer O button; and the display is controlled to perform a turn-off operation if the current display state of the display is a menu display state.

In some embodiments, as shown in FIG. 4, the micro control circuit 061 controls the display 01 to perform a turn-off operation if the current display state of the display 01 is a menu display state and the user triggers the answer O button.

Therefore, in the above-mentioned method of controlling a display by a headset with inline control provided by embodiments of the disclosure, a user may control the display to perform a corresponding operation by triggering the buttons (+, O, −) on the headset with inline control, and the user does not need to operate the function buttons on the display from a close distance. In this way, a game operation player may switch corresponding operations through the headset with inline control he wears during a game call, so that the operations are timelier, thereby improving the user experience.

Figure 7:
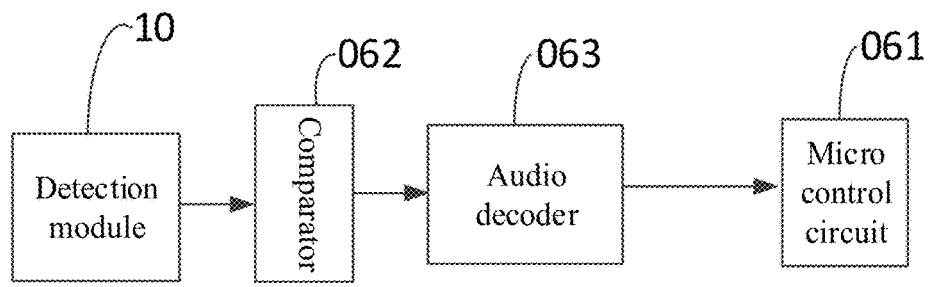
FIG. 7 is a structure diagram of a control circuit board of a display in some embodiments of the disclosure.

Based on the same disclosed concept, an embodiment of the disclosure further provides a control circuit board of a display, as shown in FIG. 7, including:

a detection module 10 configured to detect whether a headset jack of the display is plugged with a headset with inline control;

a comparator 062 configured to, after the headset jack of the display is determined to be plugged with the headset with inline control, input a detection bias voltage to the headset, and detect whether there is a change in a feedback signal of the detection bias voltage; and a micro control circuit 061 configured to identify a user's control instruction to the display using the headset according to a control signal sent by the headset when the feedback signal of the detection bias voltage is determined to have changed, where the micro control circuit 061 is further configured to control the display to perform a corresponding display operation according to the control instruction.

By adopting the above-mentioned control circuit board of a display provided by embodiments of the disclosure, a user may control the display to perform a corresponding display operation by using the headset with inline control, and the user does not need to operate function buttons on the display from a close distance. In this way, a game operation player may switch corresponding operations through the headset with inline control he wears during a game call, so that the operations are timelier, thereby improving the user experience.

In some embodiments, in the above-mentioned control circuit board provided by embodiments of the disclosure, as shown in FIG. 7, the comparer 062 is specifically configured to detect whether there is a voltage change or a frequency change in the feedback signal of the detection bias voltage.

In some embodiments, in the above-mentioned control circuit board provided by embodiments of the disclosure, as shown in FIG. 7, the comparator 062 is specifically configured to:

determine that the headset is a headset for an Android system when detecting the change in the feedback signal of the detection bias voltage is only a voltage change; and determine that the headset is a headset for an iphone system when detecting the change in the feedback signal of the detection bias voltage includes a frequency change.

In some embodiments, in the above-mentioned control circuit board provided by embodiments of the disclosure, as shown in FIG. 7, the micro control circuit 062 is specifically configured to, when the headset with inline control is determined to be the headset for the Android system, determine the control instruction performed by the headset with inline control according to changes in voltages output from a first switch and a second switch of the headset for the Android system; and determine that the user triggered a first button, such as the first button, if the voltage output from the first switch is determined to have changed;

determine that the user triggered a second button, such as the second button, if the voltage output from the second switch is determined to have changed; and determine that the user triggered an answer button if both the voltages output from the first switch and the second switch are determined to have changed.

In some embodiments, the above-mentioned control circuit board provided by embodiments of the disclosure, as shown in FIG. 7, further includes a tone decoder 063, the tone decoder 063 being configured to detect a frequency magnitude of the feedback signal after the detection bias voltage is input to the headset with inline control; and the micro control circuit 061 is specifically configured to, when the headset is determined to be the headset for the iphone system, control the tone decoder 063 to detect whether there is change in a feedback frequency of the detection bias voltage, and determine the control instruction includes:

determine that the user triggered a first button if the tone decoder 063 only detects a first frequency;

determine that the user triggered a second button if the tone decoder 063 only detects a second frequency, wherein the first frequency is greater than the second frequency; and determine that the user triggered a third button if the tone decoder 063 detects a frequency change and detects changes in both the voltages output from the first switch and the second switch.

In some embodiments, the first button is the button for increasing volume, such as button "+"; the second button is the button for reducing volume, such as the button "−"; and the third button is the answer button, such as the button "0".

In some embodiments, in the above-mentioned control circuit board provided by embodiments of the disclosure, as shown in FIG. 7, the micro control circuit 061 is further specifically configured to:

control the display to increase the volume or increase a display brightness if the control instruction is determined to be the user triggering the first button;

control the display to lower the volume or reduce the display brightness if the control instruction is determined to be the user triggering the second button; and control the display to perform a menu display, turn-on or turn-off operation based on a current display state of the display, if the control instruction is determined to be the user triggering the answer button.

In some embodiments, in the above-mentioned control circuit board provided by embodiments of the disclosure, as shown in FIG. 7, the micro control circuit 061 is further specifically configured to:

control the display to perform a menu display or turn-off operation if the current display state of the display is an on state;

control the display to perform a turn-on operation if the current display state of the display is an off state; and control the display to perform a turn-off operation if the current display state of the display is a menu display state.

It should be noted that the working principle of the above-mentioned control circuit board of a display provided by embodiments of the disclosure is same as that of the above-mentioned method of controlling a display by a headset with inline control, and for this part, please refer to the foregoing principle of controlling a display to perform a corresponding operation by using a headset with inline control, which is not repeated here.

Based on the same disclosed concept, an embodiment of the disclosure further provides a display device, as shown in FIG. 4, which includes the above-mentioned display and control circuit board provided by embodiments of the disclosure. The problem-solving principle of the display device is similar to that of the aforementioned control circuit board, and thus, for the implementation of the display device, reference may be made to the implementation of the aforementioned control circuit board, and repeated description is omitted here.

In some embodiments, the control circuit board may be integrated into the display or provided outside the display. As shown in FIG. 4, the embodiments of the disclosure are illustrated with the control circuit board provided outside the display as an example.

In some embodiments, the display may be a non-mobile device with a display function such as a television or a desktop computer. Other indispensable components of the display are present as understood by those of ordinary skill in the art, and are not described herein, nor should they be construed as limiting the disclosure.

In the method of controlling a display by a headset with inline control, and related devices provided by embodiments of the disclosure, a user may control the display to perform a corresponding display operation using the headset with inline control, and the user does not need to operate function buttons on the display from a close distance. In this way, a game operation player may switch corresponding operations through the headset with inline control he wears during a game call, so that the operations are timelier, thereby improving the user experience.

The preferred embodiments of the disclosure are described above; however, once those skilled in the art get the basic inventive concepts, they can make additional variations and modifications to these embodiments. Therefore, the appended claims are intended to be interpreted as including the preferred embodiments and all variations and modifications falling into the scope of the disclosure.

Apparently, those skilled in the art can make changes and modifications to the embodiments of the disclosure without departing from the spirit and scope of the disclosure. Thus, the disclosure is also intended to encompass these changes and modifications if such changes and modifications of the disclosure are within the scope of the claims of the disclosure and equivalents thereof.

The invention claimed is:

1. A method of controlling a display by a headset with inline control, comprising:
   detecting whether a headset jack of the display is plugged with the headset;
   after the headset jack of the display is determined to be plugged with the headset, inputting a detection bias voltage to the headset, and monitoring a feedback signal of the detection bias voltage by monitoring the feedback signal of the detection bias voltage in voltage or frequency level;

in response to detecting a change in the feedback signal of the detection bias voltage, identifying a user's control instruction to the display using the headset according to a control signal sent by the headset; and controlling the display to perform a corresponding display operation according to the control instruction;

wherein identifying a user's control instruction to the display using the headset with inline control according to a control signal sent by the headset with inline control comprises:

determining that the headset is a headset for a first system in response to detecting the change in the feedback signal of the detection bias voltage is only a voltage change; and determining that the headset is a headset for a second system in response to detecting the change in the feedback signal of the detection bias voltage comprises a frequency change;

wherein identifying a user's control instruction to the display using the headset according to a control signal sent by the headset comprises: when the headset is determined to be the headset for the second system, monitoring the feedback signal of the detection bias voltage in the frequency level, and determining the control instruction comprises: determining that the user triggered a third button in response to detecting a frequency change and detecting changes in both voltages output from a first switch and a second switch of the headset for the second system.

2. The method according to claim 1, wherein identifying a user's control instruction to the display using the headset according to a control signal sent by the headset comprises:

when the headset is determined to be the headset for the first system, determining the control instruction comprises:

determining that the user triggered a first button in response to determining that the voltage output from a first switch of the headset for the first system has changed;

determining that the user triggered a second button in response to determining that the voltage output from a second switch of the headset for the first system has changed; and determining that the user triggered a third button in response to determining that both the voltages output from the first switch and the second switch have changed.

3. The method according to claim 2, wherein controlling the display to perform a corresponding display operation according to the control instruction comprises:

controlling the display to increase a volume or increase a display brightness in response to determining that the control instruction corresponds to the first button;

controlling the display to lower the volume or reduce the display brightness in response to determining that the control instruction corresponds to the second button; and controlling the display to perform a menu display, turn-on or turn-off operation based on a current display state of the display, in response to determining that the control instruction corresponds to the third button.

4. The method according to claim 3, wherein controlling the display to perform a menu display, turn-on or turn-off operation based on a current display state of the display, in response to determining that the control instruction corresponds to the answer button comprises:

controlling the display to perform a menu display or turn-off operation if a current display state of the display is an on state;

controlling the display to perform a turn-on operation if the current display state of the display is an off state; and controlling the display to perform a turn-off operation if the current display state of the display is a menu display state.

5. The method according to claim 1, wherein identifying a user's control instruction to the display using the headset according to a control signal sent by the headset comprises:

when the headset is determined to be the headset for the second system, monitoring the feedback signal of the detection bias voltage in the frequency level, and determining the control instruction further comprises:

determining that the user triggered a first button in response to detecting a first frequency; and determining that the user triggered a second button in response to detecting a second frequency, wherein the first frequency is greater than the second frequency.

6. A control circuit board of a display, comprising a memory configured to store a computer readable program, and a processor, wherein the processor is configured to read the computer-readable program to perform following method steps:

detecting whether a headset jack of the display is plugged with the headset;

after the headset jack of the display is determined to be plugged with the headset, inputting a detection bias voltage to the headset, and monitoring a feedback signal of the detection bias voltage by monitoring the feedback signal of the detection bias voltage in voltage or frequency level;

in response to detecting a change in the feedback signal of the detection bias voltage, identifying a user's control instruction to the display using the headset according to a control signal sent by the headset; and controlling the display to perform a corresponding display operation according to the control instruction;

wherein the processor is configured to identify a user's control instruction to the display using the headset with inline control according to a control signal sent by the headset with inline control, by:

determining that the headset is a headset for a first system in response to detecting the change in the feedback signal of the detection bias voltage is only a voltage change; and determining that the headset is a headset for a second system in response to detecting the change in the feedback signal of the detection bias voltage comprises a frequency change;

wherein the processor is configured to monitor the feedback signal of the detection bias voltage in the frequency level, and determine the control instruction when the headset is determined to be the headset for the second system, by: determining that the user triggered a third button in response to detecting a frequency change and detecting changes in both voltages output from a first switch and a second switch of the headset for the second system.

7. The control circuit board according to claim 6, wherein the processor is configured to determine the control instruction when the headset is determined to be the headset for the first system, by:

determining that the user triggered a first button in response to determining that the voltage output from a first switch of the headset for the first system has changed;

determining that the user triggered a second button in response to determining that the voltage output from a second switch of the headset for the first system has changed; and determining that the user triggered a third button in response to determining that both the voltages output from the first switch and the second switch have changed.

8. The method according to claim 7, wherein the processor is configured to control the display to perform a corresponding display operation according to the control instruction, by:

controlling the display to increase a volume or increase a display brightness in response to determining that the control instruction corresponds to the first button;

controlling the display to lower the volume or reduce the display brightness in response to determining that the control instruction corresponds to the second button; and controlling the display to perform a menu display, turn-on or turn-off operation based on a current display state of the display, in response to determining that the control instruction corresponds to the third button.

9. The method according to claim 8, wherein the processor is configured to control the display to perform a menu display, turn-on or turn-off operation based on a current display state of the display, in response to determining that the control instruction corresponds to the answer button, by:

controlling the display to perform a menu display or turn-off operation if a current display state of the display is an on state;

controlling the display to perform a turn-on operation if the current display state of the display is an off state; and controlling the display to perform a turn-off operation if the current display state of the display is a menu display state.

10. The control circuit board according to claim 6, wherein the processor is configured to monitor the feedback signal of the detection bias voltage in the frequency level, and determine the control instruction when the headset is determined to be the headset for the second system, further by:

determining that the user triggered a first button in response to detecting a first frequency; and determining that the user triggered a second button in response to detecting a second frequency, wherein the first frequency is greater than the second frequency.

11. A display, comprising a control circuit board, the control circuit board comprising a memory configured to store a computer readable program, and a processor, wherein the processor is configured to read the computer-readable program to perform following method steps:

detecting whether a headset jack of the display is plugged with the headset;

after the headset jack of the display is determined to be plugged with the headset, inputting a detection bias voltage to the headset, and monitoring a feedback signal of the detection bias voltage by monitoring the feedback signal of the detection bias voltage in voltage or frequency level;

in response to detecting a change in the feedback signal of the detection bias voltage, identifying a user's control instruction to the display using the headset according to a control signal sent by the headset; and controlling the display to perform a corresponding display operation according to the control instruction;

wherein the processor is configured to identify a user's control instruction to the display using the headset with inline control according to a control signal sent by the headset with inline control, by:

determining that the headset is a headset for a first system in response to detecting the change in the feedback signal of the detection bias voltage is only a voltage change; and determining that the headset is a headset for a second system in response to detecting the change in the feedback signal of the detection bias voltage comprises a frequency change;

wherein the processor is configured to monitor the feedback signal of the detection bias voltage in the frequency level, and determine the control instruction when the headset is determined to be the headset for the second system, by: determining that the user triggered a third button in response to detecting a frequency change and detecting changes in both voltages output from a first switch and a second switch of the headset for the second system.

* * * * *